United States Patent
Madejczyk et al.

(10) Patent No.: US 10,922,661 B2
(45) Date of Patent: Feb. 16, 2021

(54) CONTROLLING A COMPUTING SYSTEM TO GENERATE A PRE-ACCEPT CACHE FOR CALENDAR SHARING

(71) Applicant: Microsoft Technology Licensing, LLC, Redmond, WA (US)

(72) Inventors: Szymon Madejczyk, Sammamish, WA (US); Balasubramanian Ramachandran, Redmond, WA (US); Jaskaran Singh, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 392 days.

(21) Appl. No.: 15/470,303

(22) Filed: Mar. 27, 2017

(65) Prior Publication Data
US 2018/0276621 A1  Sep. 27, 2018

(51) Int. Cl.
G06Q 10/00 (2012.01)
G06F 16/00 (2019.01)
G06Q 10/10 (2012.01)
G06F 16/27 (2019.01)
G06Q 10/06 (2012.01)

(52) U.S. Cl.
CPC ......... *G06Q 10/1095* (2013.01); *G06F 16/27* (2019.01); *G06Q 10/00* (2013.01); *G06Q 10/06* (2013.01); *G06Q 10/06311* (2013.01)

(58) Field of Classification Search
None
See application file for complete search history.

(56) References Cited

U.S. PATENT DOCUMENTS

| | | |
|---|---|---|
| 6,457,062 B1 | 9/2002 | Pivowar et al. |
| 7,174,517 B2 | 2/2007 | Barnett et al. |
| 7,805,676 B2 | 9/2010 | Schemers et al. |
| 7,991,637 B1 * | 8/2011 | Guiheneuf ......... G06Q 10/1095 705/7.18 |
| 8,117,264 B1 | 2/2012 | Lamb et al. |
| 8,407,768 B1 | 3/2013 | Hayter |
| 8,745,616 B1 * | 6/2014 | Deacon ................... H04L 63/12 717/177 |

(Continued)

FOREIGN PATENT DOCUMENTS

WO  2017040226 A1  3/2017

OTHER PUBLICATIONS

Royer, D., Babics, G., & Mansour, S. (2005). Calendar access protocol (CAP). (Year: 2005).*

(Continued)

*Primary Examiner* — Rutao Wu
*Assistant Examiner* — Matheus Ribeiro Stivaletti
(74) *Attorney, Agent, or Firm* — Christopher J. Volkmann; Kelly, Holt & Christenson, PLLC (57) ABSTRACT

A calendar sharing invitation is received, and a receiver of the information is identified. The calendar sharing information is sent to the receiver, and the sharer's calendar data is synchronized to a computing system corresponding to the receiver. The sharer's calendar data is synchronized to a pre-accept memory, where it is hidden from the receiver until the receiver provides an input indicating that the receiver accepts the calendar sharing invitation. The sharer's calendar data is then exposed to the receiver for interaction by the receiver.

19 Claims, 7 Drawing Sheets

(56) References Cited

U.S. PATENT DOCUMENTS

| | | | | |
|---|---|---|---|---|
| 8,805,950 | B1 | 8/2014 | Landsman et al. | |
| 8,943,140 | B1 | 1/2015 | Kothari | |
| 8,954,092 | B2 | 2/2015 | Kirmse et al. | |
| 9,485,640 | B2 | 11/2016 | Bowers et al. | |
| 9,614,880 | B1* | 4/2017 | Davis | H04L 67/26 |
| 10,136,315 | B2* | 11/2018 | Gong | H04L 63/0823 |
| 10,140,303 | B1* | 11/2018 | Patterson | G06F 11/1464 |
| 2002/0091834 | A1* | 7/2002 | Isozu | H04L 29/06027 709/227 |
| 2005/0262164 | A1 | 11/2005 | Guiheneuf et al. | |
| 2005/0267975 | A1 | 12/2005 | Qureshi et al. | |
| 2007/0233786 | A1 | 10/2007 | Rothley | |
| 2007/0244976 | A1 | 10/2007 | Carroll et al. | |
| 2007/0283279 | A1 | 12/2007 | Barnes | |
| 2007/0288614 | A1 | 12/2007 | May et al. | |
| 2008/0140498 | A1 | 6/2008 | Setty et al. | |
| 2008/0195705 | A1 | 8/2008 | Lee | |
| 2008/0256537 | A1* | 10/2008 | Fachan | G06F 3/0653 718/1 |
| 2008/0294490 | A1 | 11/2008 | Nuhaan et al. | |
| 2009/0024952 | A1 | 1/2009 | Brush et al. | |
| 2009/0100347 | A1* | 4/2009 | Schemers | G06Q 10/109 715/751 |
| 2009/0112986 | A1 | 4/2009 | Caceres | |
| 2009/0125410 | A1 | 5/2009 | Perlman | |
| 2009/0157627 | A1 | 6/2009 | Arthursson | |
| 2009/0254615 | A1* | 10/2009 | Baliga | G06Q 10/109 709/204 |
| 2010/0057516 | A1 | 3/2010 | Goraly | |
| 2010/0146115 | A1 | 6/2010 | Bezos | |
| 2010/0162105 | A1 | 6/2010 | Beebe et al. | |
| 2011/0035460 | A1 | 2/2011 | May et al. | |
| 2011/0252351 | A1 | 10/2011 | Sikora et al. | |
| 2012/0144407 | A1* | 6/2012 | Hacigumus | G06F 9/5072 719/328 |
| 2012/0232946 | A1 | 9/2012 | Cocanougher et al. | |
| 2013/0218622 | A1 | 8/2013 | Mackenzie et al. | |
| 2013/0218888 | A1 | 8/2013 | Seligmann | |
| 2013/0232213 | A1* | 9/2013 | Bustamente | H04L 67/306 709/206 |
| 2014/0035949 | A1* | 2/2014 | Singh | G06Q 10/109 345/629 |
| 2014/0066013 | A1* | 3/2014 | Mascarenhas | H04W 12/08 455/411 |
| 2014/0149886 | A1* | 5/2014 | Los | G06Q 10/1093 715/753 |
| 2014/0172944 | A1* | 6/2014 | Newton | H04L 41/50 709/202 |
| 2014/0200942 | A1 | 7/2014 | Benjamin | |
| 2014/0219034 | A1* | 8/2014 | Gomez | G11C 13/0004 365/185.22 |
| 2014/0237380 | A1* | 8/2014 | Kurrus | G06Q 10/1095 715/752 |
| 2015/0134737 | A1* | 5/2015 | Albrecht | H04L 51/32 709/204 |
| 2015/0347987 | A1 | 12/2015 | Ali | |
| 2015/0350221 | A1 | 12/2015 | Espinosa et al. | |
| 2015/0372829 | A1* | 12/2015 | Joshi | G06F 3/0485 709/206 |
| 2016/0021034 | A1* | 1/2016 | Huiban | H04L 67/06 709/206 |
| 2016/0026977 | A1 | 1/2016 | Umapathy | |
| 2016/0098687 | A1 | 4/2016 | Lamons et al. | |
| 2016/0203444 | A1* | 7/2016 | Frank | G06Q 10/1095 705/7.19 |
| 2016/0247123 | A1 | 8/2016 | Holst et al. | |
| 2016/0357464 | A1* | 12/2016 | Suzuki | G06F 3/065 |
| 2017/0086070 | A1* | 3/2017 | Henderson | G06Q 50/01 |
| 2018/0089632 | A1 | 3/2018 | Singh et al. | |
| 2018/0276593 | A1* | 9/2018 | Perret | H04L 51/32 |
| 2018/0374093 | A1* | 12/2018 | Baisnee | G06Q 20/425 |
| 2019/0109834 | A1* | 4/2019 | Lyons | G06F 21/645 |

OTHER PUBLICATIONS

"International Search Report and Written Opinion Issued in PCT Application No. PCT/US2018/023205", dated May 14, 2018, 12 Pages.

"Final Office Action Issued in U.S. Appl. No. 15/410,884", dated Aug. 12, 2019, 37 Pages.

Pinola, Melanie, "Beyond Googie Calendar and Apple Calendar: The 18 Best Apps to Manage Your Schedules", Retrieved From: https://web.archive.org/web/20170714210503/https://zapier.com/blog/best-calendar-apps/, Jun. 28, 2016, 22 pages.

"Create and Share a Public Folder", Retrieved From: https://support.office.com/en-us/article/Create-and-share-a-public-folder-A2835011-D524-4A5C-A207-05C159BB2A97, Sep. 29, 2016, 7 Pages.

Plaisant, et al., "Shared Family Calendars: Promoting Symmetry and Accessibility", In Journal of ACM Transactions on Computer-Human Interaction, vol. 13, Issue 3, Sep. 1, 2006, pp, 313-346.

"Non Final Office Action Issued in U.S. Appl. No. 15/410,884", dated Feb. 7, 2019, 24 Pages.

"Non-Final Office Action Issued in U.S. Appl. No. 15/410,884", dated Feb. 5, 2020, 22 Pages.

Mommie, Geekie. "Google Calendar for Families", Retrieved from https://www.youtube.com/watch?v=WOKHyuqeDF8, Aug. 12, 2015, 3 Pages.

Suite, G, "Youtube Channel View Coworker's Calendar", Retrieved from https://www.youtube.com/watch?v=bkwz3EMJe18, Sep. 4, 2012, 3 Pages.

"Office Action Issued in European Patent Application No. 18715457.0", dated Jul. 20, 2020, 7 Pages.

"Final Office Action Issued in U.S. Appl. No. 15/410,884", dated Sep. 4, 2020, 24 Pages.

* cited by examiner

CONTROLLING A COMPUTING SYSTEM TO GENERATE A PRE-ACCEPT CACHE FOR CALENDAR SHARING

CROSS-REFERENCE TO RELATED APPLICATION

The present application is related to co-pending U.S. application Ser. No. 15/410,884, filed Jan. 20, 2017 and entitled: "TECHNIQUES FOR SHARING ELECTRONIC CALENDARS BETWEEN MAILBOXES IN AN ONLINE APPLICATION AND COLLABORATION SERVICE", and assigned to the same assignee as the present application.

BACKGROUND

Computer systems are currently in wide use. Some computer systems run calendar applications (or calendar functionality) that allow users to perform calendar operations. Such calendar operations can be performed within an electronic mail (email) application, or in a separate calendar application. Calendar operations can include scheduling tasks and appointments, and also performing such things as sharing a calendar with another user.

In some computing systems, the calendar application is a hosted application that is hosted in a remote server environment. The hosted application can include a client component that is installed on a client device and that is used to interact with the hosted application and to present a user interface that allows the user to interact with his or her calendar. Calendar sharing operations can be performed by providing a user input indicating that that user wishes to share his or her calendar with one or more other users. This may be referred to as a sharing invitation. The sharing invitation is sent to the one or more other users where it can be accepted. Once the calendar sharing invitation is accepted, the receiver of the invitation (the one who accepted the invitation) is then given access to the sharer's calendar. The access can be general access for performing reading and writing operations on the sharer's calendar, or it can be more limited access, such as to permit viewing of the sharer's calendar only. These are examples only.

The discussion above is merely provided for general background information and is not intended to be used as an aid in determining the scope of the claimed subject matter.

SUMMARY

A calendar sharing invitation is received, and a receiver of the information is identified. The calendar sharing information is sent to the receiver, and the sharer's calendar data is synchronized to a computing system corresponding to the receiver. The sharer's calendar data is synchronized to a pre-accept memory, where it is hidden from the receiver until the receiver provides an input indicating that the receiver accepts the calendar sharing invitation. The sharer's calendar data is then exposed to the receiver for interaction by the receiver.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
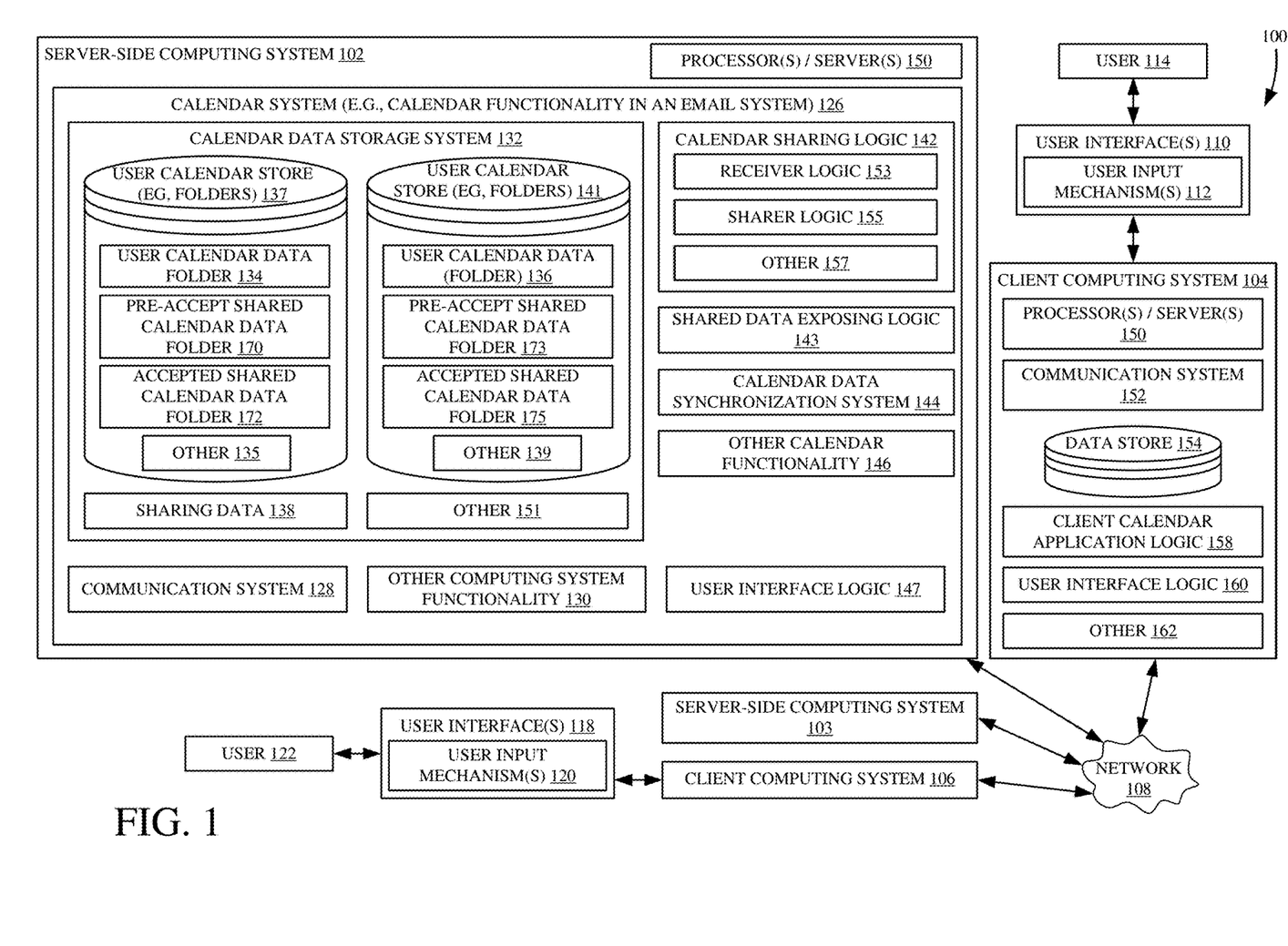
FIG. 1 is a block diagram showing one example of a computing system architecture.

FIG. 1 is a block diagram showing one example of a computing system architecture 100. Architecture 100 illustratively includes server-side computing systems 102-103 and client computing systems 104-106. Computing systems 102, 103, 104, and 106 are illustratively coupled for communication over network 108. Network 108 can be any of a wide variety of different types of networks, such as a wide area network, a local area network, a near field communication network, a cellular network, or any other of a wide variety of other networks or combinations of networks.

Before describing the overall operation of architecture 100 in more detail, a brief overview of some of the items in architecture 100, and their operation, will first be provided. Also, it should be noted that the present discussion proceeds with respect to organizing data in folders, but this is for the sake of example only. Data can be organized in other ways as well, such as by using tags or in still other ways.

In the example shown in FIG. 1, client computing system 104 is shown generating user interfaces 110 with user input mechanisms 112 for interaction by user 114. Client computing system 106 is shown generating user interfaces 118 with user input mechanisms 120 for interaction by user 122. Users 114 and 122 illustratively interact with user input mechanisms 112 and 120 in order to control and manipulate client computing systems 104 and 106, respectively, and some portions of one or more server-side computing systems 102-103.

Server-side computing systems 102-103 can be similar or different. It is assumed for the sake of the present discussion that they are similar so that only computing system 102 is described in more detail. Server-side computing system 102 illustratively includes one or more processors or servers 124, calendar system 126, communication system 128, user interface logic 147 and it can include a wide variety of other computing system functionality 130. Calendar system 126 illustratively hosts an application that performs calendar functions which allow various users 114-122 to perform a wide variety of calendaring operations. Calendar system 126 can be calendar functions within an email system or a separate calendar system. It illustratively includes calendar data store 132 which, itself, illustratively includes user calendar data stores (or folders) 137-141 for a variety of different users, and also sharing data 138 which may identify which of the users have shared their calendar data with other users. Calendar data store 132 can include a wide variety of other items 151 as well.

Each user calendar data store 137-141 can include a set of stores (or folders) that store different items of calendar data for a given user. For instance, user calendar store 137 may correspond to user 114 and include a user calendar data folder 134 that stores the calendar data for user 114. It can also include a pre-accept, shared calendar data folder 170 that stores shared calendar data before the corresponding invitation is accepted by user 114 (as is described in greater detail below). It can include accepted, shared calendar data folder 172, which stores shared calendar data after the invitation is accepted by user 114 (as is also described in more detail below).

User calendar data store 141 can have folders corresponding to user 122. It can thus include user calendar data folder 136 that stores the user calendar data for user 122, pre-accept, shared calendar data folder 173, and accepted, shared calendar data folder 175, which store shared calendar data before, and after, the corresponding invitations are accepted, respectively. User calendar data stores 137 and 141 can both include other items or folders 135 and 139 as well.

Calendar system 126 also illustratively includes calendar sharing logic 142, shared data exposing logic 143, calendar data synchronization system 144, and it can include a wide variety of other calendar functionality 146.

In the example shown in FIG. 1, calendar system 126 illustratively hosts the calendar application for interaction by the users 114-122 through the various client computing systems 104-106. The user calendar data 134-136 illustratively includes the calendar data for the users of the system. The calendar data can include information such as appointments or meetings on various days, tasks that are scheduled for various days on the user's calendar, etc.

In one example, an invitation to share a user's calendar is generated on behalf of a sharing user. That is, when a user wishes to share his or her calendar data with another user, the first user is referred to as the sharer, and the second user is referred to as the receiver. Therefore, a calendar sharing invitation is generated on behalf of the sharer, and that invitation can be accepted by the receiver. When it is accepted, a copy of the sharer's calendar data will be made available to the receiver for certain interactions. Those interactions can range from full access (such as read/write access to the sharer's calendar data) to more limited access (such as read only access, etc.). When the receiver performs a write operation on the shared data, the write operation is done on the receiver side but is eventually used to update the master data on the sharer's side.

Therefore, calendar sharing logic 142 illustratively includes sharer logic 155 that allows users to share their calendar data with one another. In one example, sharer logic 155 generates interfaces and/or detects user inputs that indicate that a user wishes to invite another user to share his or her calendar and generates an invitation that is sent to the other user (i.e., the receiver). Logic 142 can also illustratively include receiver logic 153 that generates interfaces and/or receives inputs indicating whether the receiving user (or receiver) has accepted the sharer's invitation. This information is illustratively stored as sharing data 138, and it identifies which users have invited which other users to share their calendar data, and which of the other users have accepted those invitations.

Calendar data synchronization system 144 illustratively synchronizes the user's calendar data to reflect any changes made through the user's client computing system or systems. For instance, a user may access his or her calendar data 134 using a mobile device, and synchronization system 144 will illustratively synchronize any changes made to that calendar data to computing system 102 for the user. Thus, the user can access his or her calendar through other devices as well.

In addition, synchronization system 144, as is described in greater detail below, illustratively receives an indication from calendar sharing logic 142 indicating that a sharing user has sent a calendar sharing invitation to another user (or to a receiver, such as user 122). Synchronization system 144 then establishes a pre-accept cache (or folder) 173 in the receiver's user calendar store 141 and synchronizes the sharer's calendar data in the sharer's calendar data folder 134 to that pre-accept cache 173. Before the receiver 122 accepts the calendar sharing invitation, the data in the pre-accept cache 173 is hidden from the receiver 122 by shared data exposing logic 143. When the receiver 122 accepts the invitation, the pre-accept cache 173 is exposed to the receiver 122 by shared data exposing logic 123 so that the receiver 122 can access the sharer's calendar data. Again, this is described in greater detail below.

Communication system 128 illustratively provides functionality so that computing system 102 can communicate with client computing system 104 and client computing system 106 over network 108. The communication system can be used to communicate over different types of networks as well.

Client computing systems 104 and 106 can be similar or different. For purposes of the present discussion, the client computing systems 104 and 106 will be considered to be similar. Therefore, only client computing system 104 will be described in more detail In the example shown in FIG. 1, client computing system 104 illustratively includes one or more processors or servers 150, communication system 152, data store 154, client calendar application logic 158, user interface logic 160, and it can include a wide variety of other items 162.

Client calendar application logic 158 illustratively interacts with calendar system 126. Communication system 152 illustratively includes functionality that allows client computing system 104 to communicate with other computing systems over network 108. It can include functionality that allows computing system 104 to communicate over a plurality of different types of networks as well. User interface logic 160 illustratively generates user interfaces 110 and detects interaction with user input mechanisms 112. It can provide an indication of these interactions to other items in computing system 104 or it can process those interactions itself.

Figure 2:
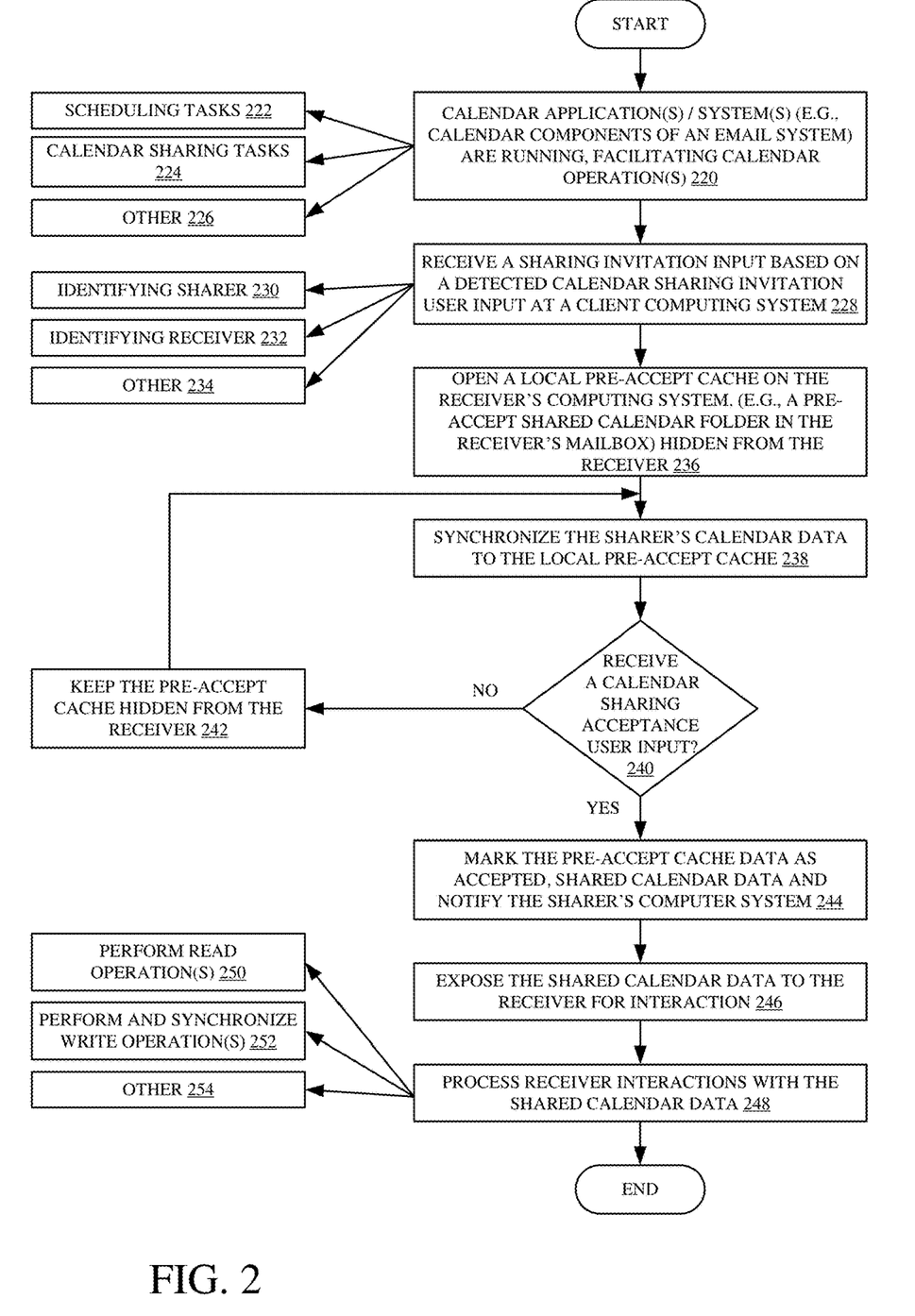
FIG. 2 is a flow diagram illustrating one example of the operation of the architecture shown in FIG. 1, in performing a calendar sharing operation.

FIG. 2 is a flow diagram illustrating one example of the operation of architecture 100 in processing a calendar sharing invitation, both before the invitation is accepted by the receiver and afterward. For purposes of the present discussion, it will be assumed that user 122 is the sharer (e.g., a calendar sharing invitation is generated on behalf of user 122), and user 114 is the receiver (e.g., the calendar sharing invitation indicates that user 122 wishes to share his or her calendar data in calendar data folder 136 with user 114). This scenario is provided by way of example only. It will be noted that a calendar sharing invitation may also be sent to multiple users simultaneously. The present operation can be carried out for each user that receives the calendar sharing invitation. However, it will only be described with respect to user 122 as the sharer and user 114 as the receiver, for the sake of example.

It is first assumed that the calendar applications and/or systems in architecture 100 are running, and facilitating calendar operations by the various users. It will be noted that the calendar applications and/or systems can be part of an email system or separate applications and/or systems. This is indicated by block 220 in the flow diagram of FIG. 2. For instance, it is assumed that calendar system 126 and client calendar application logic 158 are all running. They can facilitate calendar operations such as scheduling tasks 222, performing calendar sharing tasks 224, and a wide variety of other calendar operations 226.

Calendar sharing logic 142 then receives a sharing invitation input based on a detected calendar sharing invitation user input at client computing system 106. For instance, in one example, user 122 has interacted with sharer logic 155 (either directly or through client calendar application logic on client computing system 106) indicating that user 122 wishes to send a calendar sharing invitation to user 114. Receiving the sharing invitation input at sharer logic 155 is indicated by block 228 in the flow diagram of FIG. 2. In one example, the calendar sharing invitation identifies the sharer as user 122. This is indicated by block 230. This can be done, for instance, by including a user identifier that uniquely identifies user 122 to calendar system 126.

Also, in one example, the calendar sharing invitation identifies user 114 as the receiver. This is indicated by block 232. Again, this can be done by including a user identifier that uniquely identifies user 114 to calendar system 126. The calendar sharing invitation can be received in a wide variety of other ways, and can take a wide variety of other forms as well, and this is indicated by block 234.

Calendar sharing logic 142 then generates a signal to calendar data synchronization system 144 indicating that a calendar sharing invitation has been sent from user 122 to user 114. In response, synchronization system 144 communicates with calendar data storage system 132 to generate a pre-accept, shared calendar data folder 170 to cache the user calendar data from folder 136, before user 114 accepts the calendar sharing invitation. Synchronization system 144 then synchronizes the user calendar data (e.g., the calendar data from user calendar data folder 136) corresponding to user 122 to the pre-accept, shared calendar data folder 170 as pre-accept, shared calendar data. In one example, the pre-accept shared calendar data in folder 170 is kept hidden from user 114 by shared data exposing logic 143 until user 114 accepts the calendar sharing invitation. This can be done, for instance, by marking the folder 170 (or data items in folder 170) as hidden data so that it is not exposed to user 114 before user 114 accepts the calendar sharing invitation.

Opening a local pre-accept cache (folder 170) in the receiver's calendar store (e.g., in folders 137) and keeping it hidden from the receiver 114 is indicated by block 236 in the flow diagram of FIG. 2. Synchronizing the sharer's calendar data in folder 136 to the local pre-accept, shared calendar data folder 170 is indicated by block 238 in the flow diagram of FIG. 2.

At some point, it may be that receiver logic 153 generates a user interface indicative of the calendar sharing invitation sent by user 122, to user 114. Receiver logic 153 may then detect that user 114 has provided an input through a suitable user input mechanism 112, indicating that user 114 has accepted the calendar sharing invitation of user 122. However, before user 114 has accepted that invitation, as indicated by block 240 in the flow diagram of FIG. 2, shared data exposing logic 176 keeps the pre-accept, shared calendar data in folder 170 hidden from the receiver 114 and continues to synchronize pre-accept shared calendar data folder 170 with the sharer's user calendar data in folder 136. This is indicated by blocks 242 and 238 in the flow diagram of FIG. 2.

However, if receiver logic 153 detects that user 114 has accepted the calendar sharing invitation, then shared data exposing logic 143 marks the pre-accept, shared calendar data in folder 170 as being accepted, shared calendar data (such as the accepted shared calendar data in folder 172). It also illustratively uses communication system 152 to notify the sharer's computing system 106 that the calendar sharing invitation has been accepted. Marking the pre-accept, shared calendar data as accepted, shared calendar data and notifying the corresponding computing system is indicated by block 244 in the flow diagram of FIG. 2.

In one example, calendar sharing logic 142 can also modify sharing data 138 to indicate that the calendar data for user 122 is now accessible by user 114. Similarly, shared data exposing logic 143 illustratively exposes the shared calendar data of user 122 (in folder 170) to user 114. User 114 can then interact with the shared calendar data in an appropriate way. In one example, client calendar application logic 158 controls user interface logic 160 to provide user interfaces 110 (which can be generated by logic 143 and/or 147) which allow user 114 to access the shared calendar data for user 122. Exposing the shared calendar data in folder 170 to the receiver for interaction is indicated by block 246 in the flow diagram of FIG. 2.

Calendar system 126 then processes any receiver interaction with the shared calendar data. This is indicated by block 248. For instance, user 114 may provide a user input indicating that the user simply wishes to read the shared calendar data that user 114 now has access to (the data in folder 170). This is indicated by block 250 in the flow diagram of FIG. 2. In another example, user 114 may provide an input through a suitable user input mechanism indicating that user 114 wishes to perform a write operation on the shared calendar data (in folder 170). This is indicated by block 252. The write operation will first be done on the shared calendar data in folder 170 but is then used to update the user calendar data in folder 136 for user 122. This can be done by calendar synchronization system 144 or in other ways. It is contemplated that user 114 can interact with the shared calendar data in folder 170 in a wide variety of other ways as well, and this is indicated by block 254.

In one example, whenever user 114 makes any changes to the shared calendar data in folder 170, calendar data synchronization system 144 synchronizes those changes to the user calendar data stored in user calendar data folder 136. All of these and other architectures are contemplated herein.

It can thus be seen that, in some current systems, when a user performs a calendar sharing operation, and the sharing receiver accepts the calendar sharing invitation, then the receiver currently needs to wait while a synchronization is performed to synchronize the sharer's calendar data to the receiver's computing system (e.g., to the folder system in the receivers email mailbox). The user must wait for this synchronization operation to be performed in order to see and/or edit all of the data from the sharer's calendar. In some systems, the receiver can quickly access a read only view of a limited set of the sharer's calendar data. The synchronization operation can take an undesirably long time, especially where the sharer's calendar data is relatively large. These time and size criteria can degrade the first run experience of a calendar sharing operation, because synchronization of all of the sharer's calendar data must be performed before the receiver has access to it.

The present description provides a significant improvement in the computing system itself. The pre-accept cache (or pre-accept, shared calendar data folder) can be synchronized with the calendar data of the sharer at any time, prior to acceptance by the receiver. This allows the system to schedule the synchronization operation to be performed when network traffic is relatively light, or on a lower priority than other network operations. It also greatly enhances the user experience. It may often occur that, even prior to acceptance of the calendar sharing invitation, all of the sharer's calendar data has already been synchronized to the pre-accept cache on the receiver's computing system. Thus, when the receiver accepts the calendar sharing invitation, the receiver will often have full access, substantially immediately, to the sharer's calendar data. This not only increases the performance of the computing system itself, but it greatly enhances the user experience as well.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 3:
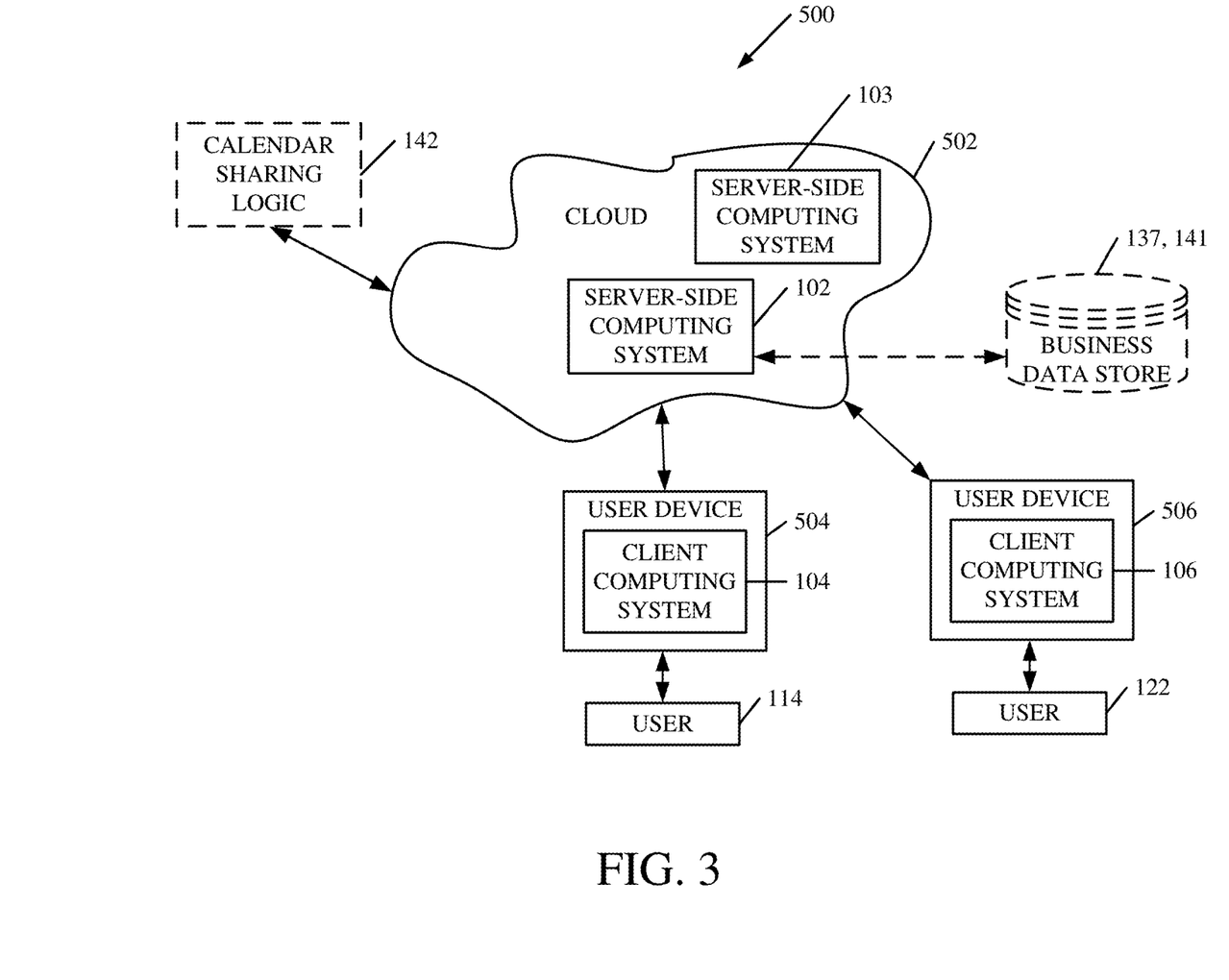
FIG. 3 is a block diagram showing one example of the architecture illustrated in FIG. 1, deployed in a cloud computing architecture.

FIG. 3 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 3, some items are similar to those shown in FIG. 1 and they are similarly numbered. FIG. 3 specifically shows that server-side client computing systems 102-103 can be located in cloud 502 (which can be public, private, or a combination where portions are public while others are private). Therefore, users 114-122 use user devices 504-506 to access those systems through cloud 502.

FIG. 3 also depicts another example of a cloud architecture. FIG. 3 shows that it is also contemplated that some elements of computing system 102-103 can be disposed in cloud 502 while others are not. By way of example, data stores 137, 141 can be disposed outside of cloud 502, and accessed through cloud 502. In another example, calendar sharing logic 142, or other logic can be outside of cloud 502. Regardless of where they are located, they can be accessed directly by devices 504-506, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 4:
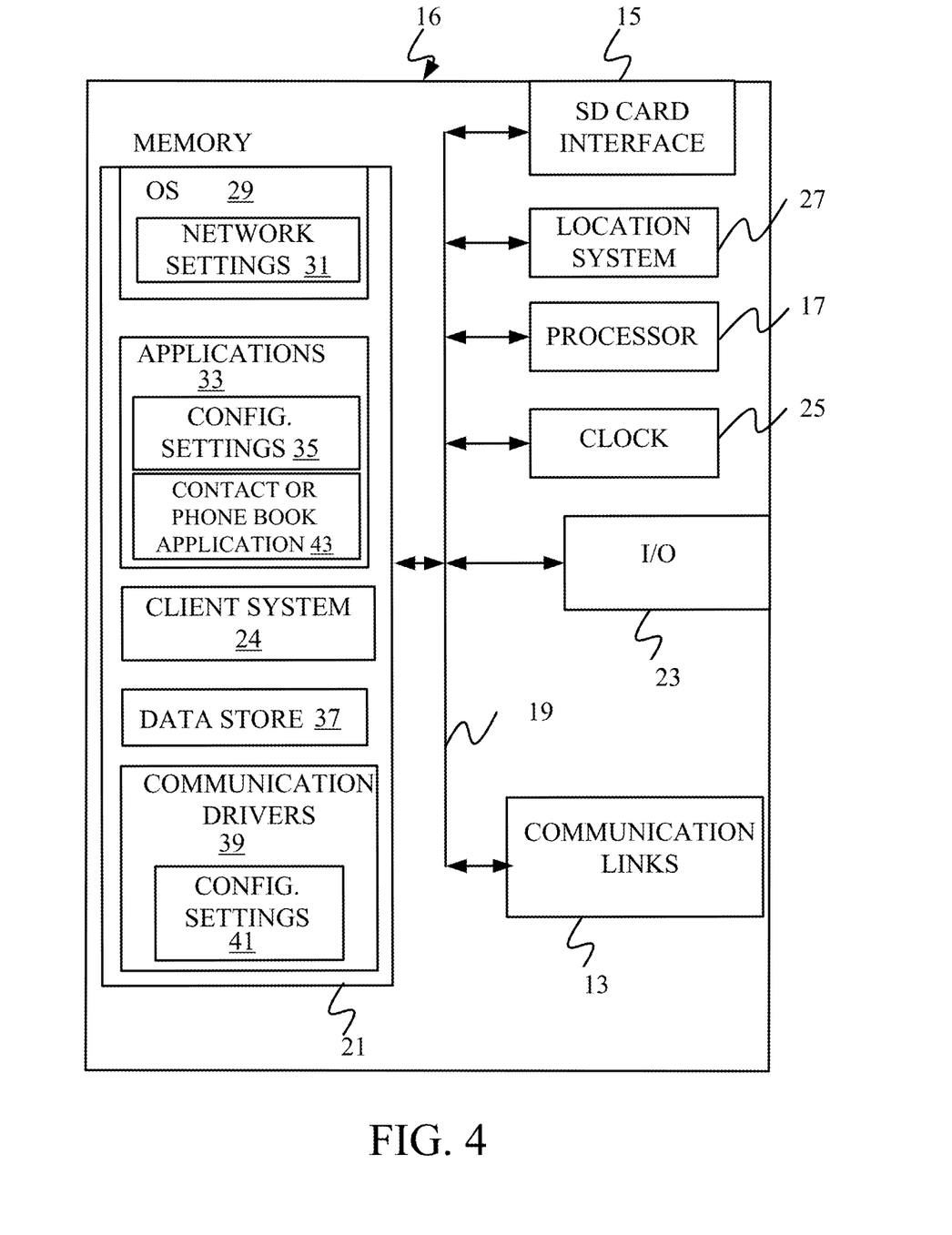
FIGS. 4-6 show examples of mobile devices that can be used in the architectures shown in the previous figures.
Figure 5:
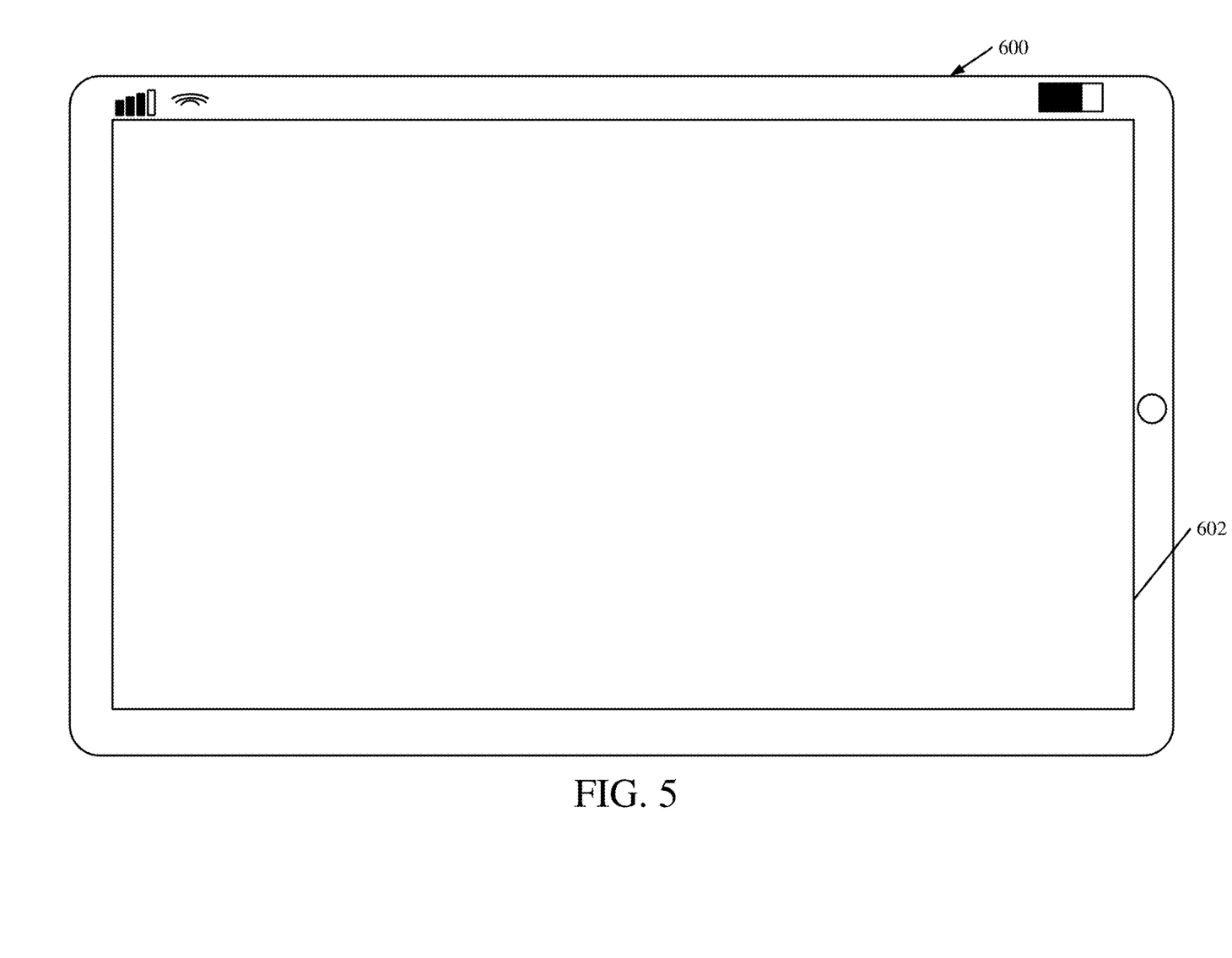
Figure 6:
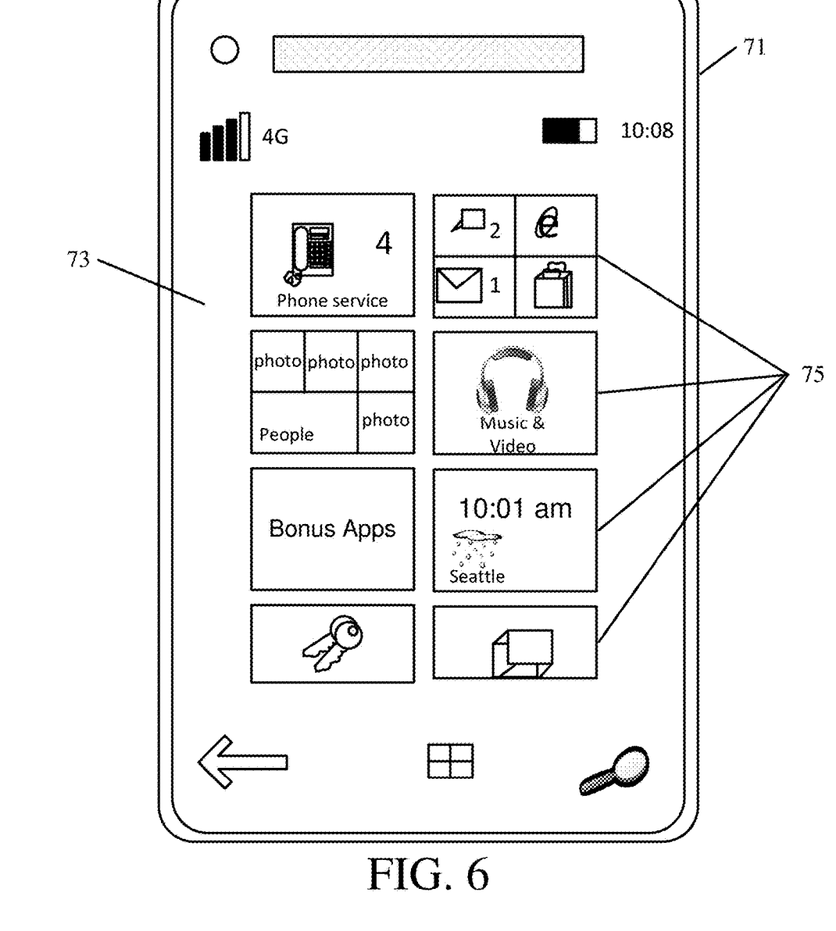

FIG. 4 is a simplified block diagram of one illustrative example of a handheld or mobile computing device that can be used as a user's or client's hand held device 16, in which the present system (or parts of it) can be deployed. FIGS. 5-6 are examples of handheld or mobile devices.

FIG. 4 provides a general block diagram of the components of a client device 16 that can run components of computing systems 102-103 or systems 104-106 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 5 shows one example in which device 16 is a tablet computer 600. In FIG. 5, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 6 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 7:
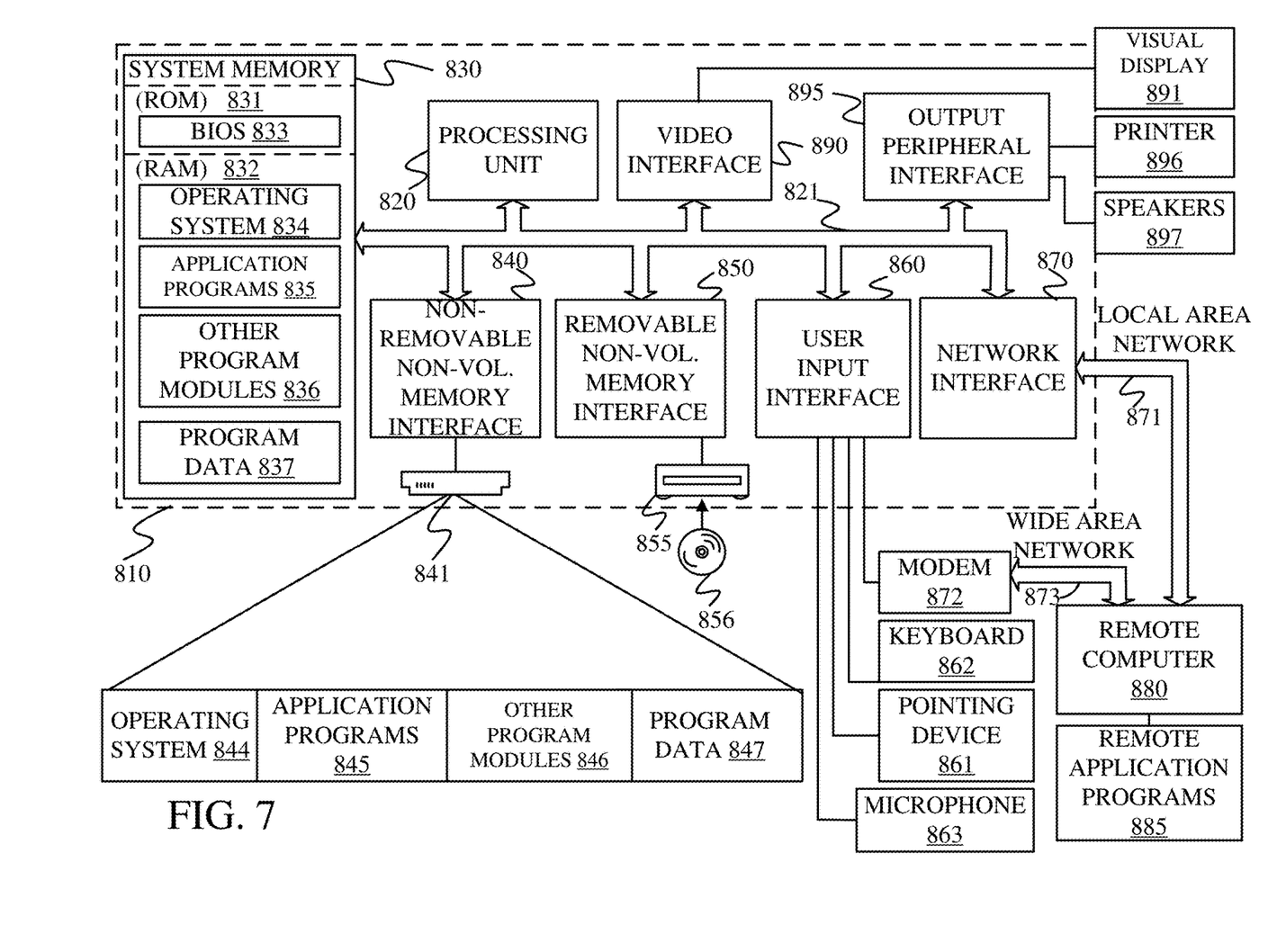
FIG. 7 is a block diagram of one example of a computing environment that can be used in the architectures shown in the previous figures.

FIG. 7 is one example of a computing environment in which architecture 100, or parts of it, (for example) can be deployed. With reference to FIG. 7, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 7.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates operating system 834, application programs 835, other program modules 836, and program data 837.

The computer 810 may also include other removable/non-removable volatile/nonvolatile computer storage media. By way of example only, FIG. 7 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 7, provide storage of computer readable instructions, data structures, program modules and other data for the computer 810. In FIG. 7, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 7 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 7 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

calendar application logic receiving a first sharing invitation indicative of an invitation to receive shared calendar data from a first user stored in a first data store;

synchronization logic that synchronizes the shared calendar data from the first data store to a pre-accept calendar store, and identifying the synchronized shared calendar data as pre-accepted, shared calendar data;

sharing receiver logic that receives an acceptance indication indicating that a second user has accepted the first sharing invitation and, in response to receiving the acceptance indication, identifies the pre-accepted, shared calendar data as accepted, shared calendar data; and shared data exposing logic that exposes the accepted, shared calendar data for access by the second user, the shared data exposing logic maintaining the pre-accepted, shared calendar data unexposed to the second user, until it is identified as accepted, shared calendar data.

Example 2 is the computing system of any or all previous examples wherein the first data store and the pre-accept calendar store are included in the computing system.

Example 3 is the computing system of any or all previous examples wherein the synchronization logic is configured to synchronize subsequent changes in the shared calendar data at the first data store to the pre-accept calendar store, the subsequent changes being subsequent to identifying the synchronized calendar data as pre-accepted, shared calendar data and prior to receiving the acceptance indication.

Example 4 is the computing system of any or all previous examples wherein the synchronization logic is configured to continue to synchronize subsequent changes in the shared calendar data from the first data store as accepted, shared calendar data after receiving the acceptance indication.

Example 5 is the computing system of any or all previous examples wherein the calendar application logic further comprises:

sharer logic configured to receive a second sharing invitation from a second user indicative of an invitation to another user to receive shared calendar data from the second user.

Example 6 is the computing system of any or all previous examples wherein the sharer logic is configured to surface a sharing invitation user input mechanism to the second user and to detect a user invitation input through the sharing invitation user input mechanism, indicative of the second sharing invitation.

Example 7 is the computing system of any or all previous examples and further comprising:

a communication system configured to communicate the second sharing invitation to a computing system corresponding to the other user.

Example 8 is the computing system of any or all previous examples wherein the sharing receiver logic is configured to surface an invitation acceptance user input mechanism to the second user and to detect a user acceptance input through the invitation acceptance user input mechanism, indicative of the acceptance indication.

Example 9 is a computing system, comprising:

a calendar system receiving a first sharing invitation indicative of an invitation to a first user to receive shared calendar data from a second user;

synchronization logic that synchronizes the shared calendar data, from a calendar data store corresponding to the second user, to a pre-accept calendar data cache in a calendar data store corresponding to the first user, and identifying the synchronized shared calendar data as pre-accepted, shared calendar data; and calendar sharing logic that, after the synchronization logic has synchronized the shared calendar data to the pre-accept calendar data cache, receives an acceptance indication indicating that the first user has accepted the first sharing invitation and, in response to receiving the acceptance indication, identifies the pre-accepted, shared calendar data as accepted, shared calendar data.

Example 10 is the computing system of any or all previous examples and further comprising:

shared data exposing logic that exposes the accepted, shared calendar data for access by the second user, the shared data exposing logic maintaining the pre-accepted, shared calendar data unexposed to the second user, until it is identified as accepted, shared calendar data.

Example 11 is the computing system of any or all previous examples and further comprising:

a communication system configured to receive the first sharing invitation from a second client computing system corresponding to the second user, to send the first sharing invitation to the first client computing system, and to receive the acceptance indication from the first computing client system.

Example 12 is the computing system of any or all previous examples wherein the computing system includes an electronic mail (email) system that includes the calendar data store.

Example 13 is a computer implemented method, comprising:

receiving a first sharing invitation indicative of an invitation to a second user to receive shared calendar data from a first user;

synchronizing the shared calendar data from a calendar data store corresponding to the first user to a pre-accept calendar store corresponding to the second user;

identifying the synchronized shared calendar data as pre-accepted, shared calendar data;

receiving an acceptance indication indicating that the second user has accepted the first sharing invitation;

before receiving the acceptance indication, maintaining the pre-accepted, shared calendar data unexposed to the second user; and after receiving the acceptance indication, exposing the pre-accepted, shared calendar data to the second user for access by the second user, as accepted, shared calendar data.

Example 14 is the computer implemented method of any or all previous examples and further comprising:

after receiving the acceptance indication, identifying the pre-accepted, shared calendar data as accepted, shared calendar data and wherein exposing comprises exposing the accepted, shared calendar data to the second user for access by the second user.

Example 15 is the computer implemented method of any or all previous examples and further comprising:

synchronizing subsequent changes in the shared calendar data corresponding to the first user to the pre-accept calendar store corresponding to the second user, the subsequent changes being subsequent to identifying the synchronized calendar data as pre-accepted, shared calendar data and prior to receiving the acceptance indication.

Example 16 is the computer implemented method of any or all previous examples and further comprising:

continuing to synchronize subsequent changes in the shared calendar data corresponding to the first user as accepted, shared calendar data after receiving the acceptance indication.

Example 17 is the computer implemented method of any or all previous examples and further comprising:

receiving a second sharing invitation from the second user indicative of an invitation to another user to receive shared calendar data from the second user.

Example 18 is the computer implemented method of any or all previous examples and further comprising:

synchronizing the shared calendar data from a calendar data store corresponding to the second user to a pre-accept cache corresponding to the other user.

Example 19 is the computer implemented method of any or all previous examples wherein receiving the acceptance indication comprises:

surfacing an invitation acceptance user input mechanism to the second user; and detecting a user acceptance input through the invitation acceptance user input mechanism, indicative of the acceptance indication.

Example 20 is the computer implemented method of any or all previous examples wherein receiving a second sharing invitation comprises:

surfacing a sharing invitation user input mechanism to the second user; and detecting a user invitation input through the sharing invitation user input mechanism, indicative of the second sharing invitation.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   at least one processor; and
   memory storing instructions executable by the at least one processor, wherein the instructions, when executed, provide:
      calendar application logic configured to receive a sharing invitation that identifies a second user to receive shared calendar data that is stored in a first data store corresponding to a first user;
      synchronization logic configured to:
         based on the sharing invitation and before the second user accepts the sharing invitation to receive the shared calendar data,
            copy the shared calendar data from the first data store to a pre-accept calendar store corresponding to the second user, and
            identify the shared calendar data, that is stored in the pre-accept calendar store corresponding to the second user, as pre-accepted shared calendar data;
      shared data exposing logic is configured to maintain the shared calendar data, that is stored in the pre-accept calendar store corresponding to the second user, unexposed to the second user based on the identification as pre-accepted shared calendar data; and
      sharing receiver logic configured to:
         receive an acceptance indication indicating that the second user has accepted the sharing invitation, and
         in response to receiving the acceptance indication, identify the shared calendar data, that is stored in the pre-accept calendar store corresponding to the second user, as accepted shared calendar data,
         wherein the shared data exposing logic is configured to expose the shared calendar data, that is stored in the pre-accept calendar store, for access by the second user based on the identification as accepted shared calendar data.

2. The computing system of claim 1 wherein the first data store and the pre-accept calendar store are included in the computing system.

3. The computing system of claim 1 wherein the synchronization logic is configured to synchronize subsequent changes in the shared calendar data at the first data store to the pre-accept calendar store, the subsequent changes being both:
   subsequent to identifying the shared calendar data, stored in the pre-accept calendar store, as pre-accepted shared calendar data, and
   prior to receiving the acceptance indication.

4. The computing system of claim 3 wherein the synchronization logic is configured to:
   after receiving the acceptance indication, continue to synchronize subsequent changes in the shared calendar data from the first data store as accepted shared calendar data.

5. The computing system of claim 1 wherein the sharing invitation comprises a first sharing invitation, and the calendar application logic further comprises:
   sharer logic configured to receive a second sharing invitation from the second user indicative of an invitation to another user to receive shared calendar data from the second user.

6. The computing system of claim 5 wherein the sharer logic is configured to surface a sharing invitation user input mechanism to the second user and to detect a user invitation input through the sharing invitation user input mechanism, indicative of the second sharing invitation.

7. The computing system of claim 5 and further comprising:
   a communication system configured to communicate the second sharing invitation to a computing system corresponding to the other user.

8. The computing system of claim 1 wherein the sharing receiver logic is configured to surface an invitation acceptance user input mechanism to the second user and to detect a user acceptance input through the invitation acceptance user input mechanism, indicative of the acceptance indication.

9. A computing system comprising:
   at least one processor; and
   memory storing instructions executable by the at least one processor, wherein the instructions, when executed, configure the computing system to:
      receive a sharing invitation that identifies a first user to receive shared calendar data that is stored in a calendar data store corresponding to a second user;
      synchronize the shared calendar data by copying the shared calendar data from the calendar data store corresponding to the second user to a pre-accept calendar data cache in a calendar data store corresponding to the first user;
      identify the synchronized shared calendar data that is stored in the pre-accept calendar data cache as pre-accepted, shared calendar data that is maintained as unexposed for access by the first user; and
      after the shared calendar data has been synchronized to the pre-accept calendar data cache,
         receive an acceptance indication indicating that the first user has accepted the sharing invitation, and
         in response to receiving the acceptance indication, identify the synchronized shared calendar data, that is stored in the calendar data store corresponding to the first user, as accepted, shared calendar data that is exposed for access by the first user.

10. The computing system of claim 9 wherein the instructions configure the computing system to:
    synchronize, after receiving the acceptance indication, subsequent changes in the shared calendar data from the second data store corresponding to the second user as accepted shared calendar data.

11. The computing system of claim 9 wherein the instructions configure the computing system to:
    receive the sharing invitation from a second client computing system corresponding to the second user, to send the sharing invitation to the first client computing system, and to receive the acceptance indication from the first computing client system.

12. The computing system of claim 11 wherein the computing system includes an electronic mail (email) system that includes the calendar data store.

13. A computer implemented method comprising:
    receiving a sharing invitation that identifies a second user to receive shared calendar data that is stored in a first data store corresponding to a first user;

based on the sharing invitation and before the second user accepts the sharing invitation to receive the shared calendar data,
- copying the shared calendar data from the first data store to a pre-accept calendar store corresponding to the second user; and
- identifying the shared calendar data, that is stored in the pre-accept calendar store corresponding to the second user, as pre-accepted shared calendar data,
- wherein the shared calendar data, that is stored in the pre-accept calendar store corresponding to the second user, is maintained as unexposed to the second user based on the identification as pre-accepted shared calendar data;

receiving an acceptance indication indicating that the second user has accepted the sharing invitation; and after receiving the acceptance indication,
- identifying the pre-accepted shared calendar data, that is stored in the pre-accept calendar store corresponding to the second user, as accepted shared calendar data, and
- exposing the accepted shared calendar data for access by the second user.

14. The computer implemented method of claim 13 and further comprising:
synchronizing subsequent changes in the shared calendar data at the first data store to the pre-accept calendar store corresponding to the second user, the subsequent changes being both:
- subsequent to identifying the shared calendar data, stored in the pre-accept calendar store, as pre-accepted, shared calendar data, and
- prior to receiving the acceptance indication.

15. The computer implemented method of claim 14 and further comprising:
after receiving the acceptance indication, continuing to synchronize subsequent changes in the shared calendar data corresponding to the first user as accepted shared calendar data.

16. The computer implemented method of claim 13 wherein receiving the acceptance indication comprises:
surfacing an invitation acceptance user input mechanism to the second user; and
detecting a user acceptance input through the invitation acceptance user input mechanism, indicative of the acceptance indication.

17. The computer implemented method of claim 13, wherein the sharing invitation comprises a first sharing invitation, and further comprising:
receiving a second sharing invitation from the second user indicative of an invitation to another user to receive shared calendar data from the second user.

18. The computer implemented method of claim 17 and further comprising:
synchronizing the shared calendar data from a calendar data store corresponding to the second user to a pre-accept cache corresponding to the other user.

19. The computer implemented method of claim 17 wherein receiving a second sharing invitation comprises:
surfacing a sharing invitation user input mechanism to the second user; and
detecting a user invitation input through the sharing invitation user input mechanism, indicative of the second sharing invitation.

* * * * *